March 3, 1953  E. B. ANDERSON  2,629,992
UNIVERSAL JOINT BONDED BOOT
Filed Dec. 11, 1951
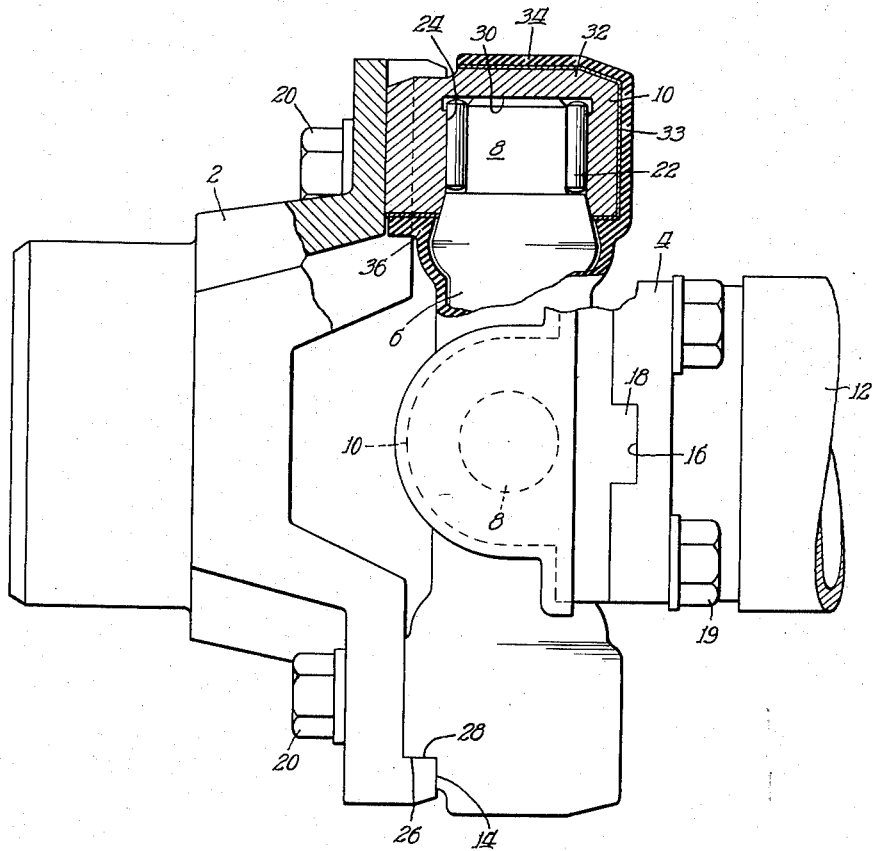
Inventor:
Edmund B. Anderson
By: H. J. Schmid
Atty.

Patented Mar. 3, 1953

2,629,992

UNITED STATES PATENT OFFICE 2,629,992

UNIVERSAL JOINT BONDED BOOT

Edmund B. Anderson, Rockford, Ill., assignor to Borg-Warner Corporation, Chicago, Ill., a corporation of Illinois Application December 11, 1951, Serial No. 260,965

8 Claims. (Cl. 64—17)

This invention relates to a flexible hermetically sealed cover for a plurality of members associated in pivotal relationship and to a method of providing a cover having said characteristics for said members. This application is a division of my co-pending patent application, Serial No. 663,664, filed April 20, 1946, now Patent No. 2,598,749, issued June 3, 1952.

An object of my invention is the provision of a method for affording a flexible hermetically sealed cover for pivotally-connected members to exclude dirt and dust from access to the connected portions thereof while permitting relative pivotal movement of the members.

A further object of my invention is to provide a method of affording a flexible hermetically sealed cover for pivotally-connected members for the purpose described which can be readily applied to the members in their assembled condition irrespective of the shape of the assembled members.

A further object of my invention to provide a boot-like cover for pivotally-connected members which hermetically seals the connected portions of the members and possesses sufficient flexibility to provide for the mechanical coaction of the parts enclosed by the cover.

A still further object of my invention is to provide such a cover for pivotally-connected members which closely follow the contour of the connected portions of said members to thereby present a minimum area of said cover to the abrasive action of external dirt thereby greatly prolonging the useful life of the cover.

Other objects of the invention will appear from the following description taken in connection with drawing, which forms a part of this specification, and in which is shown a side view of a universal joint provided with a cover in accordance with my invention, said joint being shown with one of the bearings in central longitudinal section with the cover being shown in section to more clearly illustrate the invention.

The invention as illustrated in connection with a universal joint constructed somewhat along the lines disclosed in U. S. Patent No. 1,985,531 issued December 25, 1934, to Carl E. Swenson. The universal joint illustrated consists of a pair of yokes or terminal coupling members 2 and 4 pivotally connected by means of an intermediate transmission member 6, often referred to as the spider, the same providing four trunnions 8, 90° apart. The trunnions are received in cup-shaped bearing blocks 10 each yoke being equipped with one pair of these bearings in diametrically opposed relation. The yokes 2 and 4 are suitably connected to driving and driven members or shafts (not shown) in well-known manner, one shaft 12 being shown connected to the yoke 4. The yokes 2 and 4 have machine finished surfaces 14 providing smooth seats for abutment by flat faces provided on the backs of the blocks 10. The yokes are milled to provide the radial slots 16 for reception of radial lugs 18 on the blocks 10 and are bored on opposite sides of the slots 16 to receive bolts 19 and 20 which thread in holes in lugs 18 formed on the bearing blocks 10, whereby to clamp the latter to the yokes.

The bearing blocks 10 may be provided with anti-friction rollers 22 which run on the side of the trunnions 8 on the one hand, and on the other hand, have bearing contact with the side wall 24 of the cylindrical bearing recess provided in the blocks.

Shoulders 26 are provided on the yokes for engagement with surfaces 28 on the bearing blocks to assume the load incident to end thrust, the trunnions 8 being disposed with the ends thereof arranged to bear against end thrust surfaces 30 provided on the inside of the end walls 32 of the bearing blocks 10. The bolts 20 are, therefore, relieved of load due to end thrust and torque, and serve primarily to clamp the bearing blocks to the yokes.

It will be apparent from the foregoing description, that the universal joint will permit the two shafts respectively connected to the yokes 2 and 4 to pivot with respect to each other so as to permit angular motion in all directions and in such manner that one part may convey rotary motion to the other.

According to the present invention, I have provided a flexible cover 34 completely enclosing and hermetically sealing the universal joint to exclude dirt from the bearing portions thereof while providing for the mechanical coaction of these portions encased by the cover.

The cover 34 is of boot-like shape and is formed of rubber or rubber-like material. This material may be natural rubber or synthetic rubber having the characteristics of flexibility and elasticity. Any one of several types of any suitable commercially available synthetic rubber, such as neoprene or Perbunan, may be used. Perbunan is a synthetic rubber composed of a copolymer of butadiene and acrylonitrile. Neoprene is a polymer of monochlorbutadiene. In the embodiment of the invention shown, the material of the cover is bonded to the surfaces of the bearing blocks 10 and, for the purpose of allowing pivotal movement of yokes, and thereby the shafts connected thereto, relative to the spider 6, the material of the cover is in unbonded relation to the spider and thereby loosely encases the spider while hermetically sealing the same as well as the trunnions thereof and the bearing blocks 10 to protect against external dirt and dust.

In the embodiment selected to illustrate my invention, the universal joint may be formed of steel and, therefore, it has thus far been found necessary, in utilizing one of the above mentioned rubber materials to provide a cover for the purposes described, to follow the procedure in practicing the method of my invention mentioned hereinafter given.

My novel method contemplates that the joint, in its assembled condition, has the surfaces of the bearing blocks 10 thereof plated with a brass coating 33, as shown, or painted with a suitable commercially available bonding solution such as Ti-Ply cement or Plio-Bond, to provide bonding characteristics to the metal composing these parts of the joint. Ti-Ply cement has a composition which is a trade secret, and its composition has never been chemically analyzed. It is known that Ti-Ply cement will give a satisfactory bond with rubber upon the application of a known pressure and heat. Plio-Bond is cyclized isomerized rubber or a rubber hydrochloride cement which is well known in the art as having an extensive use as a cement for bonding both natural rubber and synthetic rubber to metal, this cement being merely applied to a metallic surface, and thereafter the natural rubber or synthetic rubber in liquid form is applied to the coated surface, the natural or synthetic rubber coating is then allowed to dry either naturally or by heat in the absence of pressure application. The parts of the joint not desired to be bonded to the material of the cover, is the spider 6 which is not treated, or which, if desired, may be painted with an anti-bonding solution, such as a sodium silicate solution, or a clear lacquer. Thereafter, the joint is dipped in the fluid rubber, or the rubber is otherwise applied to the surfaces of the assembly to be treated, and, in the case of bearing blocks surfaces being brass-plated, the rubber is then cured i. e. vulcanized by heating at a suitable temperature to effect the cure of the rubber to bond the same to the treated surfaces of the bearing blocks 10. In the case of Plio-Bond being applied to the bearing blocks' surfaces, the joint need only be dipped into the fluid rubber, which is allowed to dry by exposure to the air or by heat application to effect a bond of the rubber and treated surfaces. Should Ti-Ply cement be used for surface treatment, pressure and heat are required to bond the rubber to the Ti-Ply cemented surfaces of the bearing blocks. It may be noted that in dipping the assembly in the fluid rubber or in the application of the fluid rubber to the assembly by other means, the entire assembly will be covered. It may also be noted that, after dipping the joint in the fluid rubber, or in otherwise applying the rubber to the joint, the bearing blocks 10 will have their treated surfaces covered and the spider will be entirely covered with a film of the rubber which will be bonded to the aforesaid treated surfaces and will fail to bond to the untreated spider. As a result, the rubber material will form the cover 34 which will entirely enclose and loosely fit the spider and, due to the connection of the cover 34 to the bearing blocks, will exclude external air from the assembly by forming a hermetically sealed bond between the treated surfaces of the bearing block and the rubber material. As previously pointed out, the yoke and spider are capable of relative movement due to the roller bearings 22 between the spider trunnions and the bearing blocks and it will be equally apparent that the cover is loosely fitted on the spider to flex upon relative movement of the spider and either or both of the yokes to permit such relative movement without breaking the hermetic seal by rupturing the portion of the cover bonded to the bearing blocks at their juncture 36 with the portion of the cover loosely fitting the spider. The cover thus is instrumental in sealing the pivotally connected parts of the joint while allowing free relative movement between the parts. This feature is clearly shown to be the fact as the rubber-like boot cover is bonded to the treated areas of the parts and a bond is avoided in other untreated areas of the parts which otherwise would destroy the cover were there a fixed relationship or bond between the latter parts and the relatively movable parts.

From the foregoing, it will be seen that I have provided a flexible boot-like hermetically sealed cover for a plurality of members associated in pivotal relationship and also a method of providing a cover for said members whereby dirt is excluded and the mechanical coaction of the parts covered by the boot is freely permitted. Furthermore, the cover can be readily applied to the parts in their assembled condition and irrespective of the shape of the parts, thereby dispensing with the customary practice of making a cover to suit the particular dimensions of a joint and thereafter assembling the same with the joint whereby a substantial saving is effected in the cost of manufacture of a hermetically sealed joint by the method of the present invention.

It will be readily apparent that in the event the universal joint has the bearing blocks 10 thereof formed of brass, the surfaces of the blocks need not be treated with a bonding solution to bond the rubber thereto and this step of the process may be eliminated inasmuch as the rubber will bond directly to brass. It can therefore be seen that my novel method in its application is dependent upon the bonding or anti-bonding characteristics of the metal or metals, or other material, forming the joint, as well as the characteristics of the natural or synthetic rubber, or other air-impervious resilient material, to bond or not to bond to the material of the joint, and the steps of the method will, therefore, necessarily change, or certain steps may be eliminated, in practicing my invention. The invention, therefore in its broadest aspect, contemplates the method of bonding the resilient cover to certain areas of members associated in pivotal relationship while loosely enclosing the members at their point of pivotal connection to thereby provide a flexible hermetically sealed cover for said connection while permitting free mechanical coaction of the members.

It may be noted that in the application of the fluid rubber to the joint by dipping the latter to cover the joint, substantially the entire assembly will be covered with the rubber. Upon subsequent curing treatment, the rubber will only be bonded to the treated surfaces and the other portions of the assembly, for example, the yokes 2 and 4, will have the rubber loosely fitted thereon, if desired, the rubber may be removed from these portions by cutting the rubber with a suitable instrument at the juncture of the cover bonded to the treated surfaces whereby the rubber can be freed from the joint to facilitate the adjustment of the bearing blocks and the yokes relative to each other as pointed out in the above mentioned patent. However, if the rubber is applied directly only to the treated surfaces of the bearing blocks and to the untreated spider and subsequently cured, no superfluous rubber will cover the yokes and this cutting operation may be dispensed with.

My invention contemplates that the flexible type hermetically sealed cover may be composed of either natural rubber or synthetic rubber that has the characteristics of natural rubber in the form of flexibility and ability to return to its original shape after stretching or deformation thereof. Accordingly where the term "rubber" is used in the claims it is to be construed as contemplating natural rubber or synthetic rubber having the above-identified characteristics of natural rubber.

While I have shown my invention as applied to a universal joint, it will be apparent that it is equally applicable to provide a hermetically sealed cover for other types of pivotally connected assemblies, for example, ball and socket universal joints, and steering joints of automobiles, and therefore, the embodiment of the invention shown and described is merely for purposes of illustration of the invention and is not to be limited thereto in its application.

I claim:

1. In combination, a universal joint assembly comprising a pair of opposed yoke members, an intermediate spider having trunnions, and bearing blocks receiving said trunnions and fastened to said yoke members for pivotally connecting said yoke members and said spider; and a flexible boot-like cover completely enclosing and loosely fitting said spider and having portions thereof surrounding said bearing blocks and bonded thereto to hermetically seal said joint while permitting free pivotal relationship between said spider and said yoke members.

2. In combination, a universal joint assembly comprising a pair of opposed yoke members, an intermediate spider having trunnions; and bearing blocks receiving said trunnions and fastened to said yoke members for pivotally connecting said yoke members and said spider; and a flexible cover completely enclosing and loosely surrounding said spider and having terminal portions thereof bonded to said bearing blocks and providing a hermetically sealed bond therebetween whereby said cover allows free pivotal movement of said spider and said yoke members and seals the assembly from communication with the external air.

3. In combination, a universal joint assembly consisting of a plurality of members pivotally connected together by a spider pivot element; and a flexible cover completely enclosing and loosely surrounding said spider element, said cover conforming to the shape of said spider element and having portions bonded to said members to provide a hermetic seal therebetween, thus providing a flexible loose cover for the spider element allowing free pivotal movement of the members while sealing the assembly from communication with the external air.

4. In combination, a universal joint assembly consisting of a plurality of members pivotally connected together by a spider pivot element; and a flexible cover completely enclosing and loosely surrounding said spider element, said cover being constructed of a continuous film of stretchable rubber material conforming to the shape of said spider element and having portions bonded to said members to provide a hermetic seal therebetween, thus providing a flexible loose cover for the spider element allowing free pivotal movement of the members while sealing the assembly from communication with the external air.

5. In combination, a pair of members, and a pivot element pivotally connecting together said members; and a flexible cover completely enclosing and loosely surrounding said pivot element, said cover conforming to the shape of said pivot element and having portions bonded to said members to provide a hermetic seal therebetween thus providing a flexible loose cover for the pivot element allowing free pivotal movement of the members while sealing the members and pivot element from communication with the external air.

6. In combination, a pair of members, and a pivot element pivotally connecting together said members; and a flexible cover completely enclosing and loosely surrounding said pivot element, said cover being constructed of a continuous film of stretchable rubber material conforming to the shape of said pivot element and having portions bonded to said members to provide a hermetic seal therebetween thus providing a flexible loose cover for the spider element allowing free pivotal movement of the members while sealing the members and pivot element from communication with the external air.

7. In combination, a pair of brass-plated steel members and a steel pivot element pivotally connecting together said members; and a flexible cover completely enclosing and loosely surrounding said pivot element, said cover being constructed of a continuous film of rubber conforming to the shape of said pivot element and having portions vulcanized to said brass-plated steel members to provide a hermetic seal therebetween, thus providing a flexible loose cover for the pivot element allowing free pivotal movement of the members while sealing the pivot element and members from communication with the external air.

8. In combination, a universal joint assembly comprising a pair of opposed steel yoke members, an intermediate steel spider having trunnions, and brass-plated steel bearing blocks receiving said trunnions and fastened to said yoke members for pivotally connecting said yoke members and said spider; and a flexible cover completely enclosing and loosely surrounding said spider, said cover being constructed of a continuous film of rubber conforming to the shape of said spider and having portions vulcanized to said bearing blocks to provide a hermetic seal therebetween, thus providing a flexible loose cover for the spider allowing free pivotal movement of the yoke members while sealing the bearing blocks and spider from communication with the external air.

EDMUND B. ANDERSON.

REFERENCES CITED

The following references are of record in the file of this patent:

UNITED STATES PATENTS

| Number | Name | Date |
| --- | --- | --- |
| 2,264,728 | Stillwagon Jr. et al. | Dec. 2, 1941 |

FOREIGN PATENTS

| Number | Country | Date |
| --- | --- | --- |
| 628,653 | Great Britain | 1949 |